Sept. 16, 1941.   C. A. SWANSTROM   2,255,948
SELF-LOCKING SOCKET NUT
Filed Jan. 28, 1938

INVENTOR
Carl A. Swanstrom
BY
his ATTORNEY

Patented Sept. 16, 1941

2,255,948

UNITED STATES PATENT OFFICE 2,255,948

SELF-LOCKING SOCKET NUT

Carl A. Swanstrom, Maplewood, N. J., assignor to Elastic Stop Nut Corporation, Elizabeth, N. J., a corporation of New Jersey Application January 28, 1938, Serial No. 187,356

9 Claims. (Cl. 151—7)

The present invention relates to self-locking socket nuts and has particular reference to nuts of this kind in which a deformable elastic locking insert is secured in the nut body so as to have a thread formed therein by the cooperating bolt or stud in a manner which prevents turning of the nut due to vibration, regardless of whether or not the nut is in contact with any additional part other than the bolt or stud upon which it is threaded.

In many instances where parts are secured together by a threaded nut connection, the bolt or stud extends from the inside to the outside of the structure and the nut is in an external position. In such cases it frequently happens, particularly in airplane construction, that it is desirable to have the externally located nut sunk below the level of the surrounding parts and in many other constructional examples, the clearance adjacent to the nut, even if it is externally located, is very small. In such cases it may not be possible to employ a wrench engaging the nut externally and the primary object of the present invention is the provision of a novel self-locking nut structure of the character under consideration, and a novel method for manufacturing the same, which will permit a nut of the kind under consideration to be threaded on or off its cooperating bolt by means of an internal wrench.

In order to understand the more detailed objects of the invention and the manner in which it may be carried into effect and its advantages secured, reference may best be had to the ensuing portion of this specification and to the accompanying drawing forming a part hereof, in which.

Figure 1:
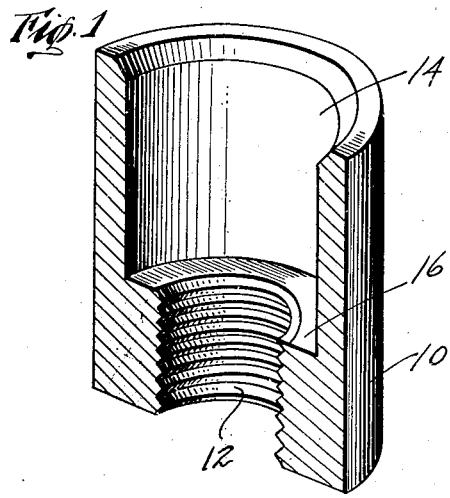
Fig. 1 is a perspective half section of a partially completed nut embodying the invention.
Figure 4:
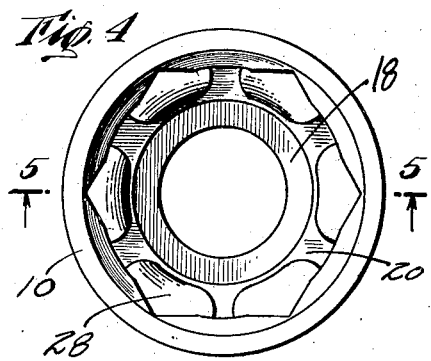
Fig. 4 is a top plan view of a completed nut.

Referring now to Figs. 1 to 5 of the drawing, the nut structure comprises an annular metal nut body 10, the exterior of which is advantageously but not necessarily of cylindrical form. At one end the bore of the nut body is provided with threads 12 and at its other end it is counterbored as at 14 to provide a shoulder 16 at the bottom of the recess. This shoulder may be square as shown or may be conical. An annular non-metallic insert 18, is deposited in the bottom of the recess in contact with shoulder 16. This washer is of some suitable deformable and elastic material, preferably of hard laminated fibre of the kind usually referred to as "vulcanized fibre." Above the ring 18 there is preferably deposited a metallic retaining washer 20 fitting the counter bore 14 and having an inner or bore diameter 22 larger than the maximum diameter of the thread 12, as will be observed from Fig. 2.

Figure 2:
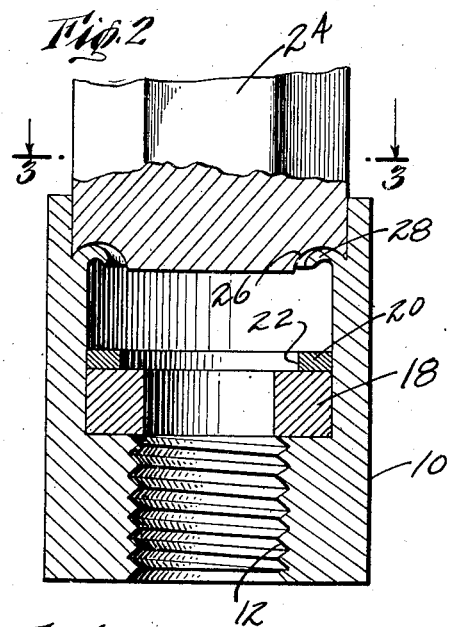
Fig. 2 is a central half section of a nut showing the locking insert in position and with a forming tool performing an operation on the nut body.
Figure 5:
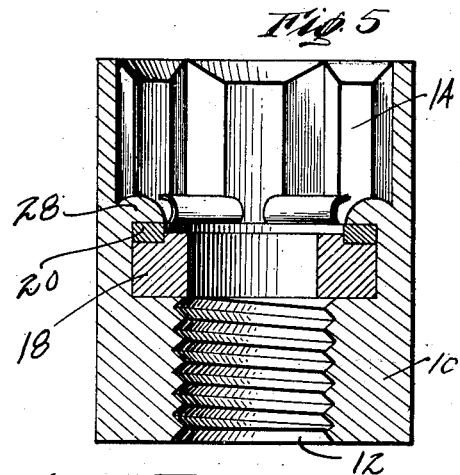
Fig. 5 is a section taken on line 5—5 of Fig. 4.
Figure 3:
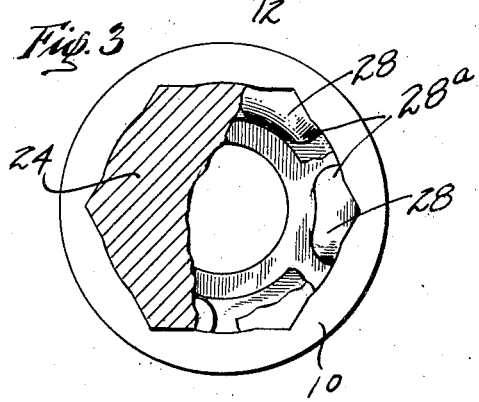
Fig. 3 is a view taken along the line 3—3 of Fig. 2.

After the insert 18 and retaining washer 20 are inserted in their proper positions in the counterbore, the wall of the counterbore above them is then shaped by a suitable tool to form any desired irregular and preferably polygonal surface for the reception of an internal wrench for turning the nut. Advantageously, the inner surface is formed to approximately the usual hexagonal cross-section and this is advantageously accomplished by means of a broaching punch 24 having suitably formed cutting edges 26 which serve to shave strips 28 from the inner surfaces of the counterbore of the nut and to turn these shaved strips inwardly and downwardly as indicated in Fig. 2. In the embodiment illustrated, a series of separate strips 28 are shown as being shaved off, but it will be evident that the tool may be of such cross-section with respect to the diameter of the counterbore that an uninterrupted annular strip may be shaved from the inner surface of the bore. The broaching of the inner surface of the counterbore accomplishes two purposes. The first is to shape the counterbore to desired wrench receiving cross sectional contour, and the second is to displace metal from the nut body for riveting over to lock the elastic insert 18 in place at the bottom of the counterbore against rotation with respect to the nut body. As will be evident from Fig. 5, the strip or strips 28 which are shaved from the counterbore are riveted over at the bottom against the retaining washer 20 and, suitable pressure being applied by means of the punch, this washer and the elastic washer 18 may obviously be firmly and permanently held against rotation by the riveted over metal.

As noted above, an uninterrupted annular strip may be removed from the inner face of the counterbore and riveted over the washer, but ordinarily it is preferable to employ a punch the contour of which is such that a series of strips are removed and riveted over. The reason for this is that a substantial depth of socket is required to provide the necessary bearing surface for the wrench and owing to the depth of the counterbore and the amount of material to be displaced in forming the wrench receiving socket, too much metal may be accumulated for riveting over the washer if metal is removed from the entire periphery of the counterbore. When strips of metal are shaved from the counterbore as in the embodiments illustrated, the accumulated metal may be displaced laterally beyond the lateral boundaries of the channel from which it was displaced, as indicated at 28ª in Fig. 4, and this lateral displacement provides for the necessary disposition of the metal without having the displaced metal project radially inwardly to an undesirable extent or be piled up vertically to an extent which would appreciably decrease the available depth of the wrench socket in a nut body of given height.

When a series of separate strips are displaced, it is preferable to employ a metal retaining washer such as washer 20, but this is not essential and the metal may be upset and riveted over directly on the fibre insert 18.

Figure 6:
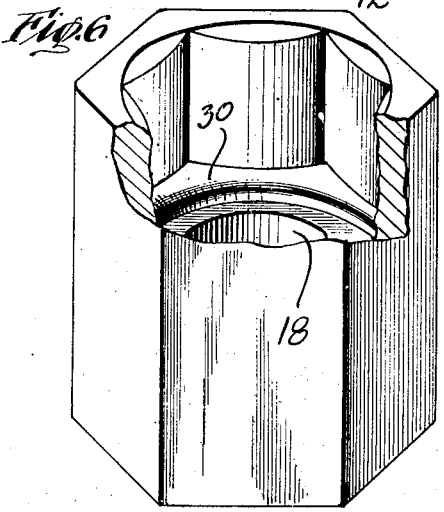
Fig. 6 is a perspective view, broken away in part, of a different form of nut.

In the nut illustrated in Fig. 6, an annular ring of metal has been displaced from the wall of the counterbore and riveted over directly on the insert 18 in the form of an uninterrupted circular band 30. Also in this embodiment, the nut has been formed from hexagonal stock and as will be evident from the figure either an internal or an external wrench may be used.

It will be evident that within the scope of the invention various changes and modifications may be made and the invention is therefore to be understood as embracing all products and methods for producing them falling within the scope of the appended claims.

What is claimed is:

1. A self-locking socket nut comprising a nut body having a bore threaded at one end and providing a wrench receiving socket of non-circular cross-section at the other end, and a locking insert located between the threaded portion of the bore and said socket, said insert being fixed in position in said bore by metal displaced from the wall of said socket.

2. A self-locking socket nut comprising a nut body having a bore threaded at one end and providing a wrench receiving socket of non-circular cross-section at the other end, a locking insert in said bore between the threaded portion and the socket, and a plurality of strips of material displaced from the side wall of said socket and riveted over to lock said insert in the bore.

3. A self-locking socket nut comprising a metal nut body having a bore threaded at one end and providing at the other end a wrench receiving socket of non-circular cross-section, a non-metallic locking insert in said bore between the threaded portion and said socket, a metal retaining washer in contact with said insert on the socket side of the insert, and metal displaced from the wall of the socket and riveted over said retaining washer to clamp said washer and said insert in said bore.

4. A self-locking socket nut comprising a metal nut body having a bore threaded at one end and providing a wrench receiving socket of polygonal cross-section at the other end, and a non-metallic locking insert between the threaded portion of the bore and said socket, said socket being formed by displacement of metal broached from the inner wall surface of the socket and the broached metal being riveted over at the bottom of the socket to clamp said insert in said bore.

5. A self-locking socket nut comprising a metal nut body having a bore threaded at one end and providing a wrench receiving socket of generally hexagonal cross-section at the opposite end, a non-metallic locking insert located in said bore between the threaded portion and said socket, and metal displaced from the wall of the socket to form the desired cross-sectional contour thereof, riveted over at the bottom of the socket to clamp said insert in place.

6. A self-locking socket nut comprising a metal nut body having a cylindrical external surface and having a bore threaded at one end and providing a wrench receiving socket at the opposite end, a non-metallic locking insert located in said bore between the threaded portion and said socket, and metal displaced from the wall of the socket to form a desired cross-sectional wrench receiving socket contour, said displaced metal being riveted over at the bottom of the socket to clamp said insert in place.

7. A self-locking socket nut comprising a nut body having a polygonal external surface and having a bore threaded at one end and providing a wrench receiving socket at the opposite end, a non-metallic locking insert located in said bore between the threaded portion and said socket, and metal displaced from the wall of the socket to form a desired cross-sectional wrench receiving socket contour, said displaced metal being riveted over at the bottom of the socket to clamp said insert in place.

8. A self-locking socket nut comprising a nut body having a bore threaded at one end and providing a wrench receiving socket at the opposite end, a non-metallic locking insert located in said bore between the threaded portion and said socket, and an uninterrupted ring of metal accumulated by displacement from the wall of the socket to form a desired cross-sectional wrench receiving socket contour, said ring being located at the bottom of the socket and riveted over to clamp said insert in place.

9. A self-locking socket nut comprising a nut body having a bore threaded at one end and providing a socket at the other end, at least the outer portion of said socket being of non-circular cross-section for receiving a wrench, and a locking insert located at the inner end of said socket adjacent to the threaded portion of the bore, said insert being fixed in position in said bore by metal displaced from the wall of said socket.

CARL A. SWANSTROM.